United States Patent [19]
Benjamin et al.

[11] Patent Number: 6,113,792
[45] Date of Patent: Sep. 5, 2000

[54] METHOD FOR REMOVING CONTAMINANTS FROM WATER USING MEMBRANE FILTRATION IN COMBINATION WITH PARTICLE ADSORPTION TO REDUCE FOULING

[75] Inventors: Mark M. Benjamin; Yu-Jung Chang, both of Seattle, Wash.

[73] Assignee: University of Washington, Seattle, Wash.

[21] Appl. No.: 08/981,346

[22] PCT Filed: Jun. 19, 1996

[86] PCT No.: PCT/US96/10737

§ 371 Date: Jun. 10, 1998

§ 102(e) Date: Jun. 1, 1998

[87] PCT Pub. No.: WO97/00719

PCT Pub. Date: Jan. 9, 1997

Related U.S. Application Data

[60] Provisional application No. 60/000,350, Jun. 20, 1995.

[51] Int. Cl.[7] ............................ B01D 15/00; B01D 61/16; C01G 49/02
[52] U.S. Cl. ......................... 210/636; 210/650; 210/663; 210/673; 210/778; 210/806; 423/633; 502/406
[58] Field of Search ...................................... 210/636, 638, 210/639, 650, 670, 673, 679, 688, 778, 806, 663; 502/406; 426/632, 633, 634

[56] References Cited

U.S. PATENT DOCUMENTS

| | | | |
|---|---|---|---|
| 4,276,160 | 6/1981 | Donnert et al. | 210/660 |
| 4,481,087 | 11/1984 | DiGiacomo | 210/684 |
| 5,051,189 | 9/1991 | Farrah | 210/679 |
| 5,073,272 | 12/1991 | O'Neill et al. | 210/728 |
| 5,110,479 | 5/1992 | Frommer et al. | 210/662 |
| 5,126,052 | 6/1992 | Lane et al. | 210/639 |
| 5,178,764 | 1/1993 | Astegger et al. | 210/651 |
| 5,364,534 | 11/1994 | Anselme et al. | 210/650 |
| 5,366,634 | 11/1994 | Vijayan et al. | 210/638 |
| 5,369,072 | 11/1994 | Benjamin et al. | 502/84 |
| 5,376,278 | 12/1994 | Salem | 210/679 |

*Primary Examiner*—Joseph W. Drodge
*Attorney, Agent, or Firm*—Christensen O'Connor Johnson & Kindness PLLC

[57] ABSTRACT

Heated iron oxide particles are combined with membrane filtration to remove contaminants from water. The use of the heated particles reduces fouling of the membrane typically encountered when membranes alone are used to remove contaminants from water. The heated particles of iron oxide are regenerable and can be reconditioned to revive their adsorption capacity. The heated particles can be added to the stream of contaminant containing water upstream of the membrane.

17 Claims, 4 Drawing Sheets

Fig. 7

METHOD FOR REMOVING CONTAMINANTS FROM WATER USING MEMBRANE FILTRATION IN COMBINATION WITH PARTICLE ADSORPTION TO REDUCE FOULING

This is a 371 of international application PCT/US96/10737, filed Jun. 19, 1996, which designates the United States, the benefit of the filing date of which is hereby claimed under 35 U.S.C. § 120, which in turn claims the benefit of U.S. provisional application No. 60/000,350, filed Jun. 20, 1995.

FIELD OF THE INVENTION

The present invention relates to methods for removal of contaminants from water utilizing membrane filtration and particulate adsorbents, reducing fouling of the membrane in such methods, and preparing particulate adsorbents for use in such methods.

BACKGROUND OF THE INVENTION

In recent years, membrane technology has been extensively investigated for water treatment. In addition to removing particulates, some membrane processes that use membranes with very small pores are able to remove a significant amount of natural organic matter (NOM); however, membranes capable of removing NOM are also more easily fouled by NOM than are membranes that have larger pores.

In conventional membrane systems, molecules that are larger than the pore size of the membrane and those that adsorb to the membrane surface are retained, while smaller molecules pass through the membrane along with the permeate flow. Typical NOM removal efficiencies for membranes having pore sizes ranging from about 0.001–0.1 microns, commonly known as ultrafiltration membranes, are around 15–20%. It has been proposed that powdered activated carbon be used in conjunction with membranes to adsorb a portion of the NOM and allow the membrane to reject the larger particulate adsorbents. While the NOM removal efficiency of such a combined process can be quite high, several problems are encountered when one attempts to regenerate the activated carbon particles. Typically, in order to regenerate powdered activated carbon, the particles must be heated to high temperatures to burn off the NOM. The cost of generating such high temperatures has a negative impact on the economics of the combined process using powered activated carbon. In addition, when powdered activated carbon particles are heated to such high temperatures, a certain portion of the particles are consumed by combustion. If the particles are not regenerated, they must be disposed of, which results in attendant disposal costs.

In addition to powdered activated carbon, it has been proposed that freshly precipitated iron or aluminum oxides be used in conjunction with membranes to reduce fouling of the membrane. While freshly precipitated iron oxide and aluminum oxide particles are commonly used to adsorb NOM in water treatment processes that do not employ membranes, when used in conjunction with membranes, it is reported that the freshly precipitated particles themselves contribute to the fouling of the membrane.

With the ever increasing concern about the quality of drinking water, there continues to be a need for improved systems for effectively and economically removing contaminants such as natural organic matter from water. Such systems should provide effective removal of contaminants from the water and should be capable of being repeatedly used and regenerated in order to provide an economical alternative to existing water treatment processes.

SUMMARY OF THE INVENTION

The present invention relates to methods for removing contaminants from water using membrane filtration in combination with contaminant adsorption onto suspended particles to reduce fouling. In accordance with the present invention, heated iron oxide or aluminum oxide particles are used in combination with a membrane to remove contaminants, such as NOM, from water. While a preferred embodiment of the present invention is described below in the context of the removal of NOM molecules from water, it should be understood that the process may be used to remove other adsorbable contaminants, e.g., metals. In another aspect, the present invention relates to a method of preparing a particulate adsorbent for use in combination with a membrane to remove contaminants from water and reduce fouling of the membrane.

In a method of reducing fouling in a process of removing contaminants from water utilizing a particulate adsorbent and a membrane carried out in accordance with the present invention, contaminant containing water is first contacted with the particulate adsorbent that comprises heated particles of iron oxide or aluminum oxide. At least a portion of the contaminants in the water are adsorbed onto the adsorbent particles that are unable to pass through the membrane. Thus, during or after the adsorbing step, as the permeate passes through the membrane, the adsorbent particles are retained within the membrane as part of the concentrate. Unlike conventional membrane only filtration systems wherein the permeate flux declines significantly over time, the method of the present invention suffers no substantial decrease in permeate flux over an extended period.

Figure 7:
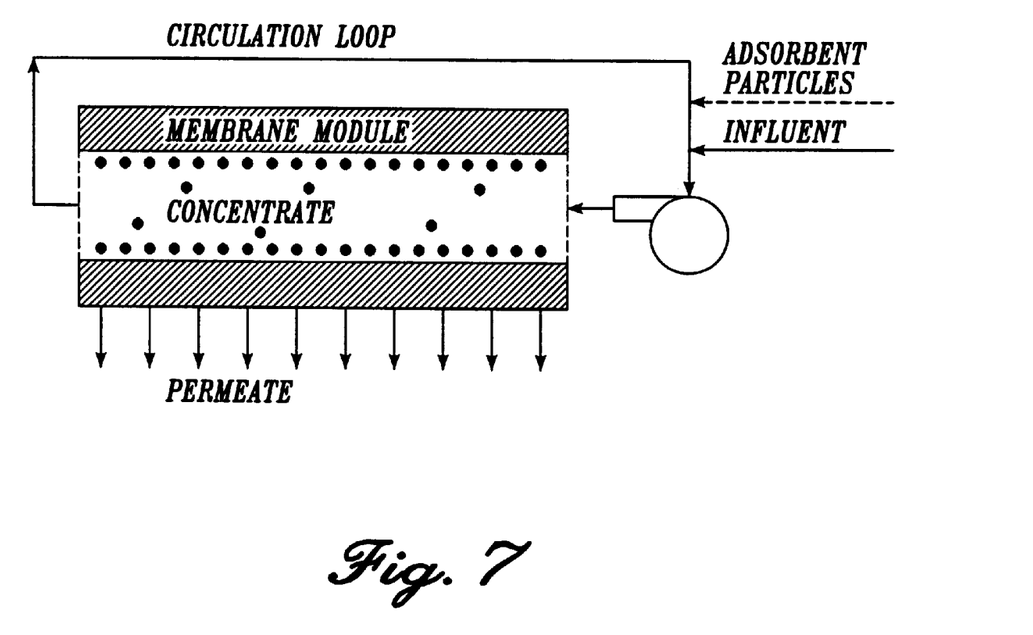
FIG. 7 is a schematic illustration of a membrane circulation loop employing a method carried out in accordance with the present invention.

In a particular embodiment of carrying out a method of the present invention, adsorbent particles are dosed into a membrane system along with a small amount of influent flow to be treated during the first few seconds or minutes of a treatment cycle. The particles are either deposited on the membrane surface or they become part of the recirculating flow that continually passes along and through the "concentrate" side of the membrane (see FIG. 7). The dose of adsorbent particles added during this time is sufficient to treat all the water that is anticipated to enter the system during a complete treatment cycle. Once all the particles for one treatment cycle are added, the feed flow continues, but no more particles are added. During the remainder of the treatment cycle, the entering flow contacts the adsorbent particles that are deposited on the membrane or are mixed with the flow in the circulating fluid. As a result, at least a portion of the contaminants in the water are adsorbed onto the adsorbent particles that are unable to pass through the membrane. A typical treatment cycle lasts one hour or more, at which time the particles are flushed from the system and a new cycle begins.

In a preferred embodiment of this aspect of the present invention, the heated particles of iron oxide or aluminum oxide are prepared by preparing an aqueous solution of ferric ion or aluminum ion and hydroxyl ion. The ferric ion or aluminum ion is then converted to its corresponding oxide to produce a suspension of the oxide. This suspension is then heated to provide heated particles of iron oxide or aluminum oxide that are characterized by the substantial absence of a crystalline pattern when x-rayed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In pressure-driven membrane systems, water moves toward the membrane surface due to the pressure difference across the membrane. Contaminants, such as NOM, are brought to the membrane surface by this flow. Depending on the size of the NOM molecules or their affinity for the surface of the membrane, the NOM is either retained on the "concentrate" side of the membrane or is allowed to pass through the membrane as permeate. Examples of NOM includes things such as humic and fulvic acid. It is currently beyond scientific capabilities to identify precisely the composition of the molecules that comprise natural organic matter. Many of these molecules are degradation products from the decay of living matter. In the absence of a more precise classification, the wide range of natural organic compounds is classified into a few composite categories. Humic and fulvic acid are the largest such categories. It has been estimated that, on the average, 50% of the dissolved organic matter in rivers falls into these two categories, although the percentage in any particular river could be anywhere from 10% to 90%.

Membranes useful in accordance with the present invention include those known in the art and used in microfiltration, ultrafiltration and nanofiltration systems. Each of the above filtration systems employs a membrane, the difference being the size of the pores in the membrane. For microfiltration, the membrane typically have pores having an average diameter on the order of 0.1 to several microns. Ultrafiltration typically refers to membranes having pores ranging in size from about 0.001–0.1 microns. Membranes having pores generally on the order of 0.0005–0.002 microns are referred to as nanofiltration membranes. Each of these membranes separates the influent into a concentrate and a permeate. As discussed above, those constituents in the influent that are small enough to pass through the pores of the membrane, pass through the membrane as permeate. Those constituents in the influent that are not able to pass through the pores, or which have an affinity for the membrane surface, are retained by the membrane as concentrate.

One example of a suitable membrane for use in accordance with the present invention is a membrane made of cellulose acetate derivatives available from Lyonnaise des Eaux. Preferred membranes are hollow fiber membranes capable of receiving influent flow into the inside of the fiber with the permeate passing through the membrane wall. An example of a membrane fiber useful in accordance with the present invention has an inside diameter on the order of 1.0 millimeter and a wall thickness of about 0.4 millimeters. Most of the membrane wall is merely supporting material, in that the thickness of the membrane layer itself is less than 1.0 micrometer. Such types of membranes can typically be operated with a permeate flux on the order of about 150 $L/m^2$-hr. It should be understood that the present invention is not limited to the use of any particular type of membrane. The composition of the membrane and the size of the pores of the membrane may vary over a wide range, depending on the particular contaminants that are to be removed in accordance with the present invention.

The particulate adsorbents useful in accordance with the present invention to reduce fouling of membrane filters include those particulate adsorbents capable of adsorbing the contaminant of interest and also reducing or preventing fouling of the membrane. Without intending to be limited to any particular theory, when water is driven through a membrane, the contaminants, such an NOM, that are rejected by the membrane tend to remain near the membrane surface, so that the contaminant concentration is higher near the membrane surface than in the bulk solution. This phenomenon is often referred to as concentration polarization, and the region where the concentration polarization occurs is called the concentration polarization layer. If the concentration of the contaminant in the concentration polarization layer exceeds the solubility of the contaminant in the water, then the contaminant may precipitate or otherwise deposit as a gel layer or other flow restricting layer on the membrane surface. At this time, it is believed that the formation of this flow restricting layer contributes to the fouling of the membrane.

In accordance with the present invention, the use of iron oxide or aluminum oxide particles heated in accordance with the present invention can reduce the fouling typically encountered when membrane filtration is used to remove contaminants, such as NOM, from water. While the following discussion will focus on preferred heated iron oxide particles, it should be understood that other types of particles, such as heated aluminum oxide, which can be efficiently and economically regenerated are considered to be within the scope of the present invention. In addition, the following discussion focuses on the removal of NOM from water; however, it should be understood that other contaminants, such as metals, may also be removed from water employing the adsorbent/membrane filtration process carried out in accordance with the present invention, by using a particulate adsorbent having an affinity for the metal.

The preferred heated iron oxide and heated aluminum oxide particles of the present invention are to be distinguished from freshly precipitated iron oxide particles and freshly precipitated aluminum oxide particles that have not been heated or dehydrated after precipitation. Although these unheated freshly precipitated oxide particles are known to be effective adsorbents for NOM, they do not reduce or prevent fouling of the membrane, and in fact appear to contribute to the fouling of the membrane. (See Example 1 below.)

The preferred heated iron oxide and aluminum oxide particles differ from the freshly precipitated iron oxide or aluminum oxide particles in that they are subjected to a controlled heating step after the oxides are precipitated.

Without intending to be limited to any particular theory, it is believed that this heating step reduces the water content or hydration of the freshly precipitated particles which reduces the likelihood that the particles themselves will contribute to the formation of a gel layer and contribute to fouling of the membrane.

In accordance with the present invention, the heating of the iron oxide or aluminum oxide particles is controlled to avoid overheating the particles to the point where their adsorption capacity for NOM is reduced. Again, while not intending to be limited to any theory, it is believed that a point is reached in the dehydration of the particles where the adsorption capacity of the particles for NOM decreases because the porosity of the freshly precipitated particles decreases and therefore the adsorption capacity is limited to the adsorption that occurs at the particle surface.

In an effort to characterize the heated iron oxide particles that exhibit satisfactory adsorption capacity for NOM and also reduced fouling of the membrane, x-ray patterns for the heated iron oxide particles were observed. Those particles that exhibit satisfactory NOM adsorption properties and also reduce or prevent fouling of the membrane, do not exhibit a crystalline pattern when x-rayed. It should be understood that the foregoing reference to the lack of a crystalline pattern is intended to characterize those preferred heated iron oxide particles that are capable of adsorbing NOM and preventing fouling of the membrane. It may be that particles that exhibit a partial crystalline pattern or a full crystalline pattern would also adsorb NOM and also prevent fouling in accordance with the present invention.

One method of preparing the preferred iron oxide particles or aluminum oxide particles involves the step of first providing iron ions or aluminum ions in an aqueous solution. Iron-ion-containing solutions can be provided by adding ferric chloride or ferric nitrate, or other ferric salts, to water. Solutions of aluminum ions can be provided by adding aluminum chloride, aluminum sulfate, or aluminum nitrate, or other aluminum salts, to water. Hydroxyl ion is then added to the solution to provide a ratio of about 2.0 to about 2.5 moles hydroxyl ion per mole metal ion. Iron oxide or aluminum oxide particles are allowed to precipitate and form a suspension of the oxide particles. This suspension of oxide particles is then heated, preferably at a temperature of about 80° C. to about 130° C. for a period of time sufficient to reduce the water content to about 45–55 weight percent. The resulting dehydrated suspension can be resuspended in water, settled, and decanted several times to remove excess ions.

The above description of the preparation of heated iron oxide or heated aluminum oxide particles is illustrative of a method for making particles that are effective at adsorbing NOM and reducing or preventing fouling of the membrane in accordance with the present invention. It should be understood that heated iron oxide particles or heated aluminum oxide particles with a partial crystalline x-ray pattern or even with a full crystalline x-ray pattern may provide satisfactory results; however, at this time, heated particles that exhibit no crystalline pattern are preferred. Also, different heating schemes may be used to achieve the 45–55% water content. For example, higher temperatures for shorter periods of time or lower temperatures for longer periods of time may be employed. In addition, particles obtained from a suspension that has been heated to a water content that falls outside the 45–55 weight percent range, may also be effective at adsorbing NOM and preventing or reducing fouling of the membrane.

The process of using the heated particulate adsorbents and a membrane to remove contaminants can be practiced in a number of forms. In all cases, the heated iron oxide particles or heated aluminum oxide particles are contacted with the water as it is being passed through the membrane. Such contact can occur using a static system wherein the influent flow is introduced into the membrane at a rate that is substantially equivalent to the permeate flux through the membrane. A static system is also referred to as a "dead-end" type of approach to pumping the influent into the membrane.

At this time, the preferred approach employs a recirculating membrane filtration system wherein the contaminated water is continuously circulated through the membrane as the permeate passes through the membrane wall. Initially, the heated adsorbent particles are introduced into a stream of clean water or influent water to be treated circulating through the membrane. By adding the heated adsorbent particles to the recirculating water, good mixing of the particles is achieved. Circulation of the water and heated particles is preferably continued until a cake forms on the inner surface of the membrane. Influent is then introduced into the recirculating stream and continued until clogging or reduction in permeate flow is observed or reduction in the degree of NOM removal is observed. At this point, the recirculation can be stopped and the membrane can be backwashed to remove contaminants or particles that have become lodged within the pores of the membrane. During and/or after the backwashing step, a tangential flushing step can be carried out in order to flush out the inner surface of the membrane and recover the heated adsorbent particles.

After the heated adsorbent particles are recovered, in accordance with a preferred aspect of the present invention, the particles may be regenerated by exposing them to an alkaline environment, e.g., pH 13. It has been observed that regeneration at pH 13 has a tendency to adversely affect the adsorption capacity of the heated adsorbent particles. It may be that regeneration at pHs lower or higher than 13 for longer or shorter periods of time may not have as large an adverse impact on the adsorption capacity of the heated adsorbent particles formed in accordance with the present invention.

Notwithstanding the foregoing, the regenerated heated adsorbent particles, formed in accordance with the present invention, can be reconditioned to restore at least a portion of their adsorption capacity by exposing the particles to acidic conditions such as a pH on the order of 3. The pH of 3 is exemplary of acidic conditions that may be used to recondition the heated adsorbent particles. It may be that regeneration, at higher or lower pHs for longer or shorter periods of time than described herein, may be more effective at reconditioning the heated adsorbent particles.

As described below in more detail in the examples, it has been observed that the combination of membrane filtration and heated iron oxide or aluminum oxide particles provides dissolved organic carbon (DOC) removal efficiencies on the order of 45–85%. This is in contrast to an efficiency of about 12–23% for membrane filtration alone. Also, as explained below in more detail in the examples, a membrane filtration system that employs heated iron oxide particles is able to maintain a permeate flux over an extended period of time that is substantially equivalent to the permeate flux of the same membrane without heated adsorbent particles wherein clean water is being passed through the membrane. In contrast when unheated freshly precipitated iron oxide particles are combined with membrane filtration, fouling of the membrane occurs.

The following detailed examples provide additional disclosure regarding preferred aspects of the present invention.

It should be understood that the present invention is not intended to be limited to the specific embodiments set forth in the following examples.

EXAMPLE 1

This example illustrates the effectiveness of the present invention in removing NOM from water and also its effectiveness in reducing or preventing fouling of the membrane. The membrane used in this example was a hollow fiber ultrafiltration membrane supplied by Lyonnaise des Eaux. The membrane was operated in a cross-flow configuration, with the influent flow through the inside of the fiber and the permeate passing through the membrane wall. The membrane was made of cellulose acetate derivatives and had a nominal pore size of 10 nanometers. The inside diameter of the membrane fiber was 0.93 millimeters and the thickness of the wall was about 0.4 millimeters. Most of the membrane wall was merely supporting material, and the thickness of the membrane layer itself was less than 1.0 micrometer. The membrane typically operates with initial permeate flux of about 150 L/m$^2$-hr at a cross membrane pressure differential of 1 bar.

In order to best control the flow of influent through a particular membrane fiber and to reduce the amount of water required for this example, a mini-hollow fiber membrane module was constructed that contained only one fiber. Soft tubing was used to house the fiber, thus providing a section of the module that could be easily cut off in order to analyze the membrane surface, yet allow the rest of the membrane to be easily put back into operation.

The membrane system was operated in a conventional cross-flow configuration, with a tangential velocity supplied by a circulation pump. An operation cycle started with a brief period during which a slurry of heated iron oxide particles (prepared as described below) was injected into the circulating stream. Influent flow of contaminated water was then introduced into the loop. The adsorption process occurred in the loop, and the permeate passed through the membrane wall where it was collected. In all of the cycles, the influent pressure of the system was controlled at about 15 psi. Flushing and backwashing of the system was accomplished using a small portion of the permeate.

The NOM source for all the cycles was a small lake with a total organic carbon concentration of about 30 milligrams per liter and a pH of about 6.8. The raw water was filtered through a 0.45 micron filter, diluted to 4.5 milligrams per liter of total organic carbon (TOC), and the pH was adjusted to about 7 before use.

The same membrane was also set up in a static system for operation under a static mode without adsorbent particles. During operation in the static mode the same source of NOM was employed.

Figure 5:
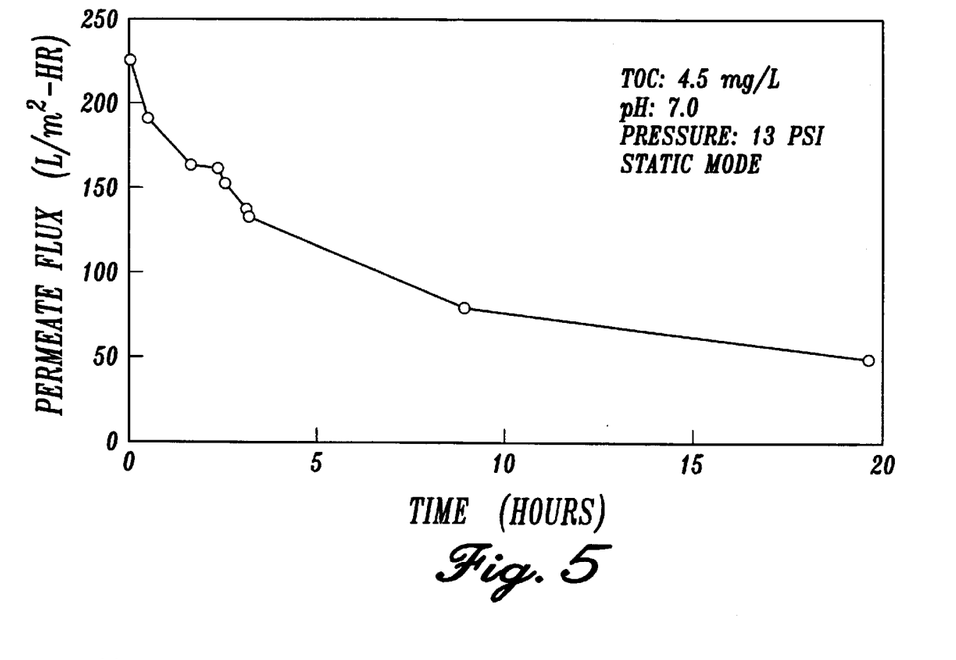
FIG. 5 is a graphical illustration of the permeate flux versus time during a treatment cycle with no recirculation flow.

FIG. 5 shows a curve of permeate flux versus time during a run in the static operation mode without heated iron oxide particles. Over a 20-hour period, the permeate flux decreased over 75% from about 230 to about 50 L/m$^2$-hr. Membrane samples were taken for surface analysis at different times, and the scanning electron microscope images of these samples show the growth of a NOM gel layer (up to 2 micrometers in thickness) over time. The scanning electron micrograph images provide strong evidence of the formation of a gel layer on the membrane surface and the correlation between the thickness of that gel layer and the permeate flux decline.

In order to observe the effect of heated iron oxide particles when combined with membrane filtration, 170 milligrams of heated iron oxide particles per liter of water were introduced into the membrane loop. The heated iron oxide particles were made by preparing a solution using 1 gram hydrated ferric chloride (FeCl$_3$.6H$_2$O, purified, J. T. Baker Chemical Co.) per milliliter de-ionized water (3.7 moles Fe/L). This solution (A) was stirred until the ferric chloride dissolved completely. A solution of 10M NaOH was gradually added to solution (A) until the pH reached 7.0 (OH added/Fe molar ratio near 3), while the solution was stirred vigorously, generating a thick suspension (B) of hydrous iron oxide particles. Suspension (B) was then heated in an oven for 4 to 24 hours at 80–130° C. Shorter heating times were used with higher temperatures; for instance, heating for 4 hours at 130° C. or 24 hours at 80° C. yielded approximately the same result, i.e., a sludge having a water content of about 45–55 weight percent. The sludge was then resuspended in high quality water, settled, and decanted several times to remove excess Cl$^-$ and Na$^+$ ions.

The recirculation was carried out on a one-hour cycle time with loop flushing and backkwashing being provided at the end of each one hour cycle. Table 1 below lists NOM removal efficiencies for three different natural water sources accomplished by this combined process. The addition of heated iron oxide particles increased the dissolved organic carbon removal efficiencies of the systems, from between 10–23% in the absence of heated iron oxide particles, to between 47–85% with them.

TABLE 1

| | DOC Removal Efficiency | | |
| --- | --- | --- | --- |
| | Lake Pleasant | Lake Washington | Skagit PUD |
| Membrane only | 23% | 10% | 12% |
| Membrane and Heated Particles (170 mgFe/L) | 71% | 47% | 85% |

Figure 1:
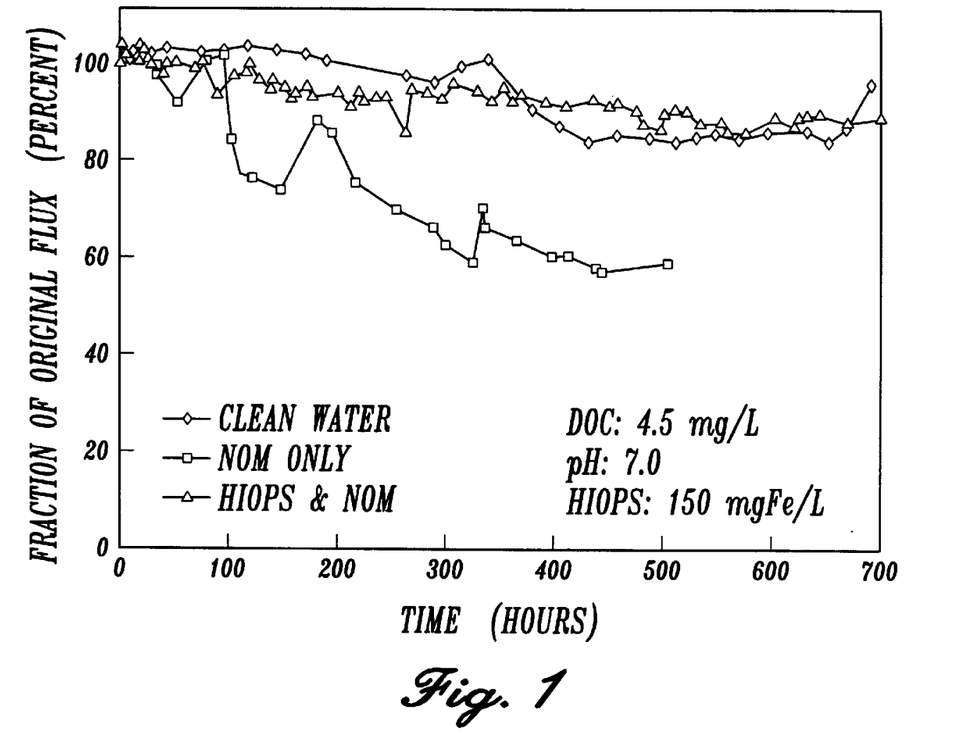
FIG. 1 is a graphical illustration of the effect of heated iron oxide particles (HIOPs) on permeate flux through a membrane in accordance with the present invention.

FIG. 1 shows the permeate flux decline over time for the systems with and without heated iron oxide particles. Over the course of at least 700 hours, the permeate flux in the system with heated iron oxide particles was at least about 90% of the initial permeate flux and essentially identical to that in the control run using NOM-free water only and was substantially higher than in the run without adsorbent particles. Scanning electron microscope images of the membrane showed that a cake layer of iron oxide particles, approximately 100 micrometers thick, formed on the membrane surface during operation with the heated iron oxide particles. Since this cake layer did not reduce flux, compared to the run with NOM only and no adsorbents, the hydraulic conductivity of the oxide cake layer must have been higher than that of the membrane, i.e., the oxide cake layer did not contribute significant hydraulic resistance to the permeate flow. After backwashing, the thickness of the cake layer was reduced to about 15–20 micrometers, and the layer was completely removed from patches of the membrane surface. These patches contained no visible (by scanning electron microscope images) deposited or precipitated NOM, suggesting that no NOM gel layer grew on the membrane surface when oxide particles were added. It appears that the reduction of approximately 80% of the total dissolved organic carbon concentration in the bulk solution (by adsorption) led to a corresponding reduction in the total dissolved organic carbon concentration in the concentration polarization layer, thereby preventing that concentration from exceeding the NOM solubility. In addition to the reduction in bulk NOM concentration, the oxide cake layer may also directly interact with the concentration polarization layer to interfere with gel formation.

As a comparison and not as an example of the present invention, unheated iron oxide particles prepared as described above, but without heating suspension (B) and therefore without drying it to a water content of about 45–55 weight percent, were substituted for the heated iron oxide particles in the above procedure. In nine out of the ten test runs, the membrane flow path became clogged within 71 hours, some runs were clogged in as little as 0.5 hours. In the one example run that the membrane flow path was not clogged, the prefilter for the raw water became clogged by the unheated iron oxide particles in about 6 hours.

EXAMPLE 2

This example illustrates the regenerability of heated iron oxide particles and the effect of the regeneration on the adsorption properties of those particles. A batch of heated iron oxide particles as prepared in Example 1, was saturated with diluted water from a natural lake source. The pH of the water was adjusted to 7 and then the particle slurry was regenerated by soaking in an aqueous solution at pH 13 for 30 minutes. The slurry was then settled, decanted, and rinsed with low organic water adjusted to pH 13. The solution pH was then adjusted to neutral. This process was repeated five times, after which the heated iron oxide particles were used in a standard adsorption/ultrafiltration run as described above in Example 1.

Although the regeneration of the heated iron oxide particles in this example was nearly complete (about 90–95% of the adsorbed total organic carbon was released), the adsorption capacity of the particles decreased by 35% after five sorption-desorption cycles. The NOM removal efficiency in the adsorption/ultrafiltration run using these heated iron oxide particles was about 60%.

Another batch of heated iron oxide particles was prepared as in Example 1 and subjected to five cyclic pH changes as described above. This batch was not saturated with the lake water. The adsorption capacity of this batch of heated iron oxide particles decreased by 20%, suggesting that the adsorption-desorption process reduced the adsorption capacity of heated iron oxide particles to a greater extent than just repeated pH changes. The loss of adsorption capacity during an adsorption-desorption process may be due to a preloading effect. Although most of the adsorbed NOM molecules were desorbed during the regeneration process, it is possible that the small fraction (about 5%) of the adsorbed NOM that remained on the oxide surface, was specifically bound to the strongest binding sites. Extensive regeneration (i.e., stronger base and longer regeneration time) may regenerate these strong binding sites.

EXAMPLE 3

This example illustrates that heated iron oxide particles prepared in accordance with the present invention can be effectively reconditioned. Although heated iron oxide particles prepared in accordance with the present invention can be efficiently regenerated (at pH 13 for 30 minutes), as evidenced in Example 2, the surface structure and adsorption properties of the particles change in the alkaline environment. Optimizing the regeneration process (e.g., by using lower base concentration and/or shorter regeneration time) may minimize deterioration of adsorption capacity while maintaining high regeneration efficiencies. However, the long term effect of regeneration on the adsorption capacities of the heated iron oxide particles could still be significant.

In order to evaluate the possibility of reactivating or reconditioning heated iron oxide particles that have been regenerated in various ways, heated iron oxide particles regenerated as described below were soaked in NaOH solutions at pH 3 and then their adsorption isotherms were determined in order to assess the particles adsorption capacities.

Figure 2:
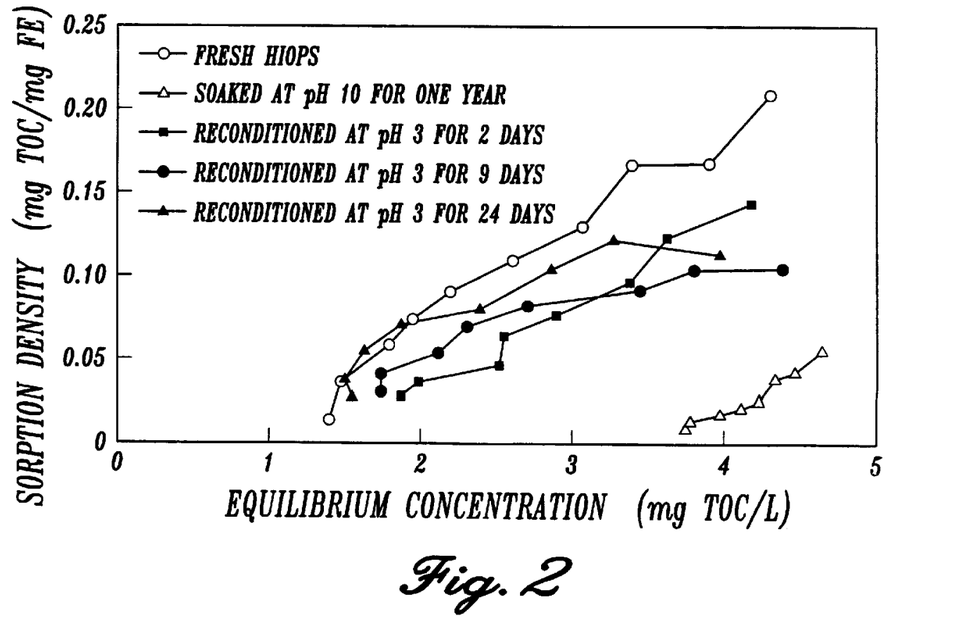
FIG. 2, 3, and 4 are graphical illustrations of the effect of reconditioning on the adsorption capacity of heated iron oxide particles formed in accordance with the present invention.

Heated iron oxide particles prepared as described in Example 1 that had been preserved at pH 10 for one year were reconditioned at pH 3 for 2, 9, or 24 days and their adsorption capacities determined. FIG. 2 illustrates that the longer the heated iron oxide particles were reconditioned at pH 3, the more adsorption capacity they recovered. The adsorption capacity of this batch of heated iron oxide particles was almost fully recovered after 24 days of reconditioning. FIG. 2 also illustrates adsorption capacities for heated iron oxide particles prior to regeneration and for freshly made heated iron oxide particles.

Figure 3:
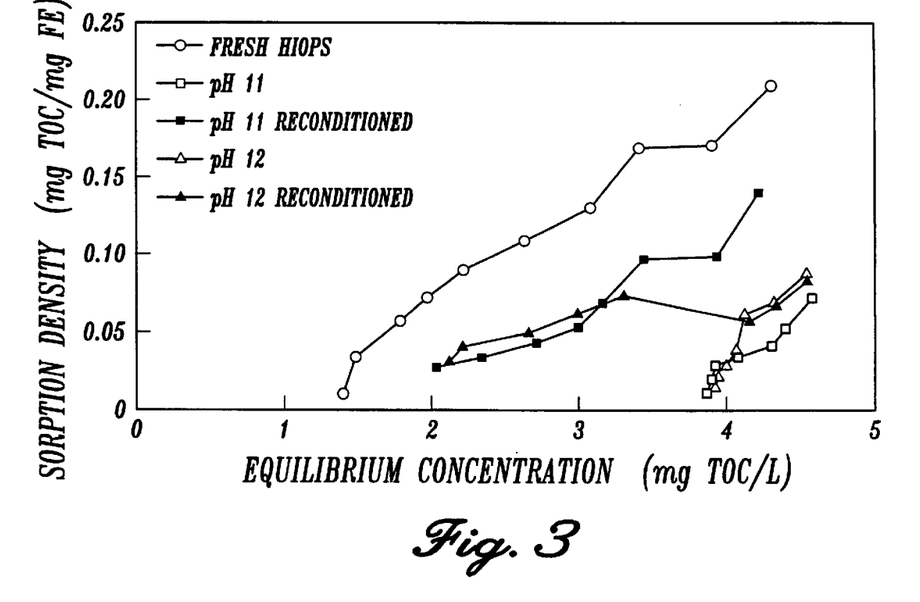

Batches of heated iron oxide particles prepared as described in Example 1 and soaked in a NaOH solution at pH 11 and 12 were reconditioned at pH 3 for 24 days and their adsorption capacities determined. The adsorption capacities for batches prior to reconditioning, after reconditioning, and prior to soaking in NaOH are graphically illustrated in FIG. 3. FIG. 3 shows that the adsorption capacities of the two batches of heated iron oxide particles soaked in NaOH were only partially (about 50%) recovered.

Figure 4:
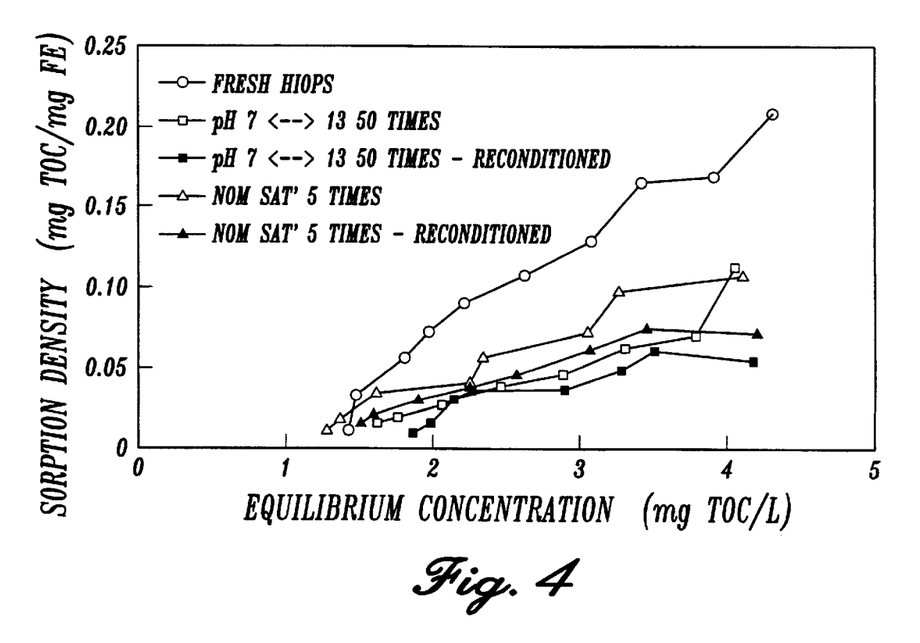

Batches of the heated iron oxide particles saturated with NOM from a natural lake source and then regenerated as described above in Example 2 were exposed to a NaOH solution at pH 3 and their adsorption capacities determined. FIG. 4 illustrates that these reconditioning steps were not effective at reconditioning the heated iron oxide particles subjected to cyclic NOM saturations/regeneration for five times, as described in Example 2.

Batches of heated iron oxide particles prepared as described in Example 1 were suspended in a NaOH solution at pH 13 for 30 minutes to simulate the regeneration conditions. The pH was then readjusted to neutral using HCl. This process was repeated 50 times and the adsorption capacity of these particles was determined and is graphically depicted in FIG. 4. These same particles were then soaked in a NaOH solution at pH 3 for 24 days and their adsorption capacities were determined. FIG. 4 graphically illustrates that these reconditioning conditions were not effective at reconditioning the heated iron oxide particles that had been cycled between pH 7 and pH 13 50 times.

The effectiveness of the reconditioning process at pH 3 decreases with increasing pH of the preceding regeneration step and depends on the duration of reconditioning (at least for the particles soaked at pH 10). Lower pH for reconditioning might accelerate the process and be more effective for the heated iron oxide particles regenerated at the higher pH.

EXAMPLE 4

In this example, adsorption isotherms of 5 types of adsorbent particles (unheated iron oxide particles, UHIOPs; heated iron oxide particles, HIOPs; goethite, a crystalline iron oxide; hematite, a different crystalline iron oxide, and heated aluminum oxide particles, HAOPs) were determined in jar tests. The heated aluminum oxide particles were prepared identically to the heated iron oxide particles described in Example 1 with the exception that aluminum sulfate was used a starting material instead of ferric chloride.

In the test, Lake Pleasant water was filtered through 0.45 micrometer membrane filters, diluted by a factor of three using low organic water, and adjusted to pH 7 using 0.5M NaOH or HCl. The water originally contained 9.5 mg/L of TOC. 100 milliliters of this water was put into 250 milliliter beakers, to which different amounts of one type of oxide particles were added. A test with different amounts of particles was conducted using each absorbent.

The solution in each beaker was well mixed for 30 minutes, while the pH of the solution was controlled at 7.0 plus or minus 0.02. The mixture was then filtered through a 0.45 micrometer filter, and the TOC concentration of the filtrate was determined. The concentration of particles in the slurries was determined by digesting 0.5 milliliters of the suspension in 30 milliliters of 50% nitric acid at 100° C., and analyzing the resulting solution for iron or aluminum.

Adsorption isotherms were then prepared for each adsorbent by plotting the adsorption density (mg TOC adsorbed per mole of Fe or Al in the slurry) against the equilibrium TOC concentration (mg/L).

Figure 6:
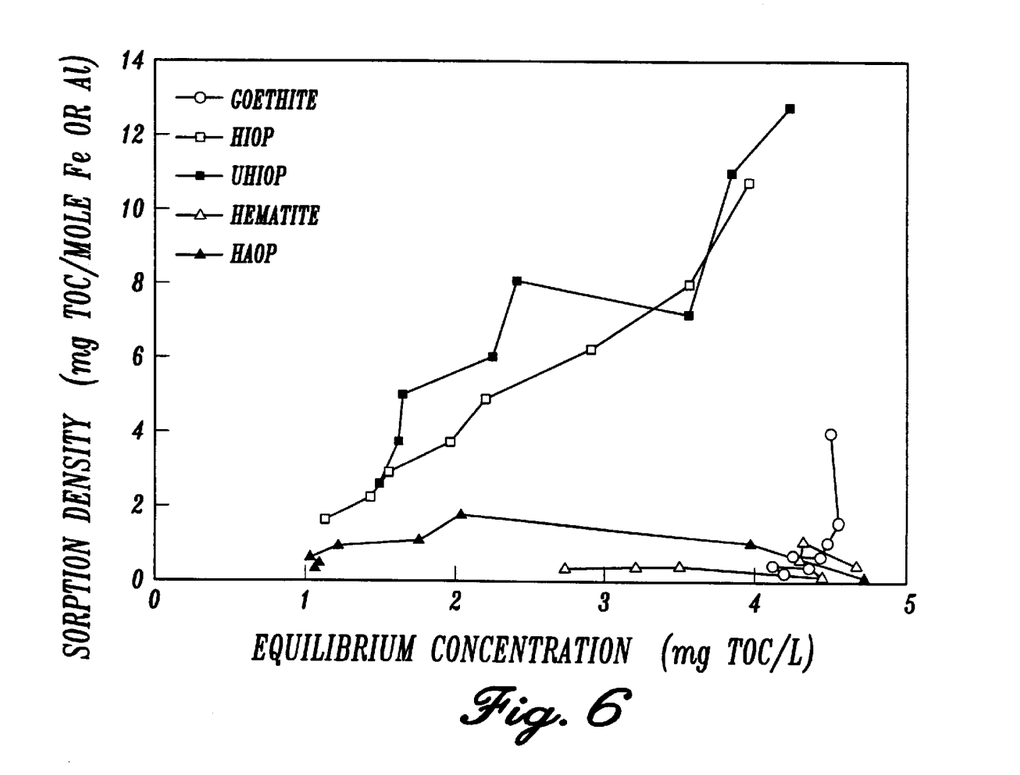
FIG. 6 is a graphical illustration of the adsorption capacity of various adsorbent particles.

The results are illustrated in FIG. 6. In FIG. 6, the higher the value on the y-axis for a given value on the x-axis, the better is the adsorbent at removing NOM from solution. The unheated iron oxide particles and heated iron oxide particles dramatically outperformed any of the other adsorbents tested, indicating that, at least for the conditions for the test, these uncrystallized particles are better adsorbents for NOM than are the crystalline iron oxides goethite and hematite or the heated aluminum oxide particles, for which the crystallinity is unknown.

The heated aluminum oxide particles were then used in a membrane filtration test similar to that described in Example 1. Unheated aluminum oxide particles have been used by others in combination with filtration techniques, and the results have been similar to the results obtained with unheated iron oxide particles. That is, NOM removal for the influent solution was good, but the membranes clogged. In this test, with heated aluminum oxide particles, the results were similar to those with crystalline iron oxide particles; the membranes did not clog, but NOM removal was minimal. It appears that the unheated aluminum oxide particles and the heated aluminum oxide particles used in this example represent two end points of a spectrum, more or less identical to the end points represented by unheated iron oxide particles and crystalline iron oxides. That is, the unheated particles tend to clog the membranes and, if the particles are heated excessively and allowed to crystallize, although they don't clog the membrane, they lose most of their adsorption capacity. In between these end points, heated aluminum oxide particles exist that have the desirable properties at both end points, i.e., they adsorb NOM and don't clog the membrane.

While the preferred embodiments of the invention have been illustrated and described, it will be appreciated that various changes can be made therein without departing from the spirit and scope of the invention. For example, the heated iron oxide and heated aluminum oxide particles of the present invention may be made by processes other than the ones expressly described herein. Such particles would be considered to be within the scope of the present invention if they are capable of adsorbing contaminants in the water and preventing or reducing fouling of the corresponding membrane. The novel and inventive aspects of the present invention also extend to the removal of contaminants other than NOM from water. Finally, although the preferred heated iron oxide particles are described above as exhibiting no crystalline pattern when x-rayed and having a water content of about 45–55%, heated iron oxide particles that do not necessarily meet these criteria, yet which also adsorb NOM and prevent or reduce fouling of the membrane, will fall within the scope of the subject matter that applicants consider their invention.

The embodiments of the invention in which an exclusive property or privilege is claimed are defined as follows:

1. A method for removing contaminants from water by passing a flow of the water, containing particles of iron oxide, through a membrane without fouling the membrane comprising the steps:

contacting the water with particles consisting essentially of iron oxide that have been heated at a temperature ranging between about 80° C. to about 130° C., adsorbing a portion of the contaminants from the water onto the particles; and passing a portion of the water through the membrane to separate the contaminant containing water into a permeate and a concentrate.

2. The method of claim 1, wherein the particles of iron oxide exhibit substantially no crystalline pattern when x-rayed.

3. The method of claim 1, wherein the particles of iron oxide prior to heating at a temperature between about 80° C. to about 130° C. are prepared by:

preparing an aqueous solution of ferric ion and hydroxyl ion; and converting the ferric ion to its corresponding oxide and producing a suspension of the oxide.

4. The method of claim 3, wherein the heating step reduces the water content of the suspension to between about 45 and about 55 weight percent.

5. The method of claim 3, wherein the heating step provides particles of iron oxide that are characterized by the substantial absence of a crystalline pattern when x-rayed.

6. The method of claim 3, wherein the ferric ion is derived from ferric chloride or ferric nitrate.

7. The method of claim 1, further comprising the steps of:

backwashing the membrane to remove contaminants and particles of iron oxide from the membrane; and flushing the membrane to remove the particles from the membrane.

8. The method of claim 7, wherein the pH is adjusted to about 10 or above.

9. The method of claim 1, further comprising the step of:

regenerating the particles of iron oxide by adjusting the pH of the environment surrounding the adsorbent to above 7.

10. The method of claim 9, further comprising the step of:

reconditioning the particles of iron oxide by adjusting the pH of the environment surrounding the particles to below 7.

11. The method of claim 10, wherein the pH is adjusted to about 3 or below.

12. The method of claim 1, wherein about 50 to about 85 percent of the contaminants in the water are removed.

13. The method of claim 1, further comprising the step of forming a layer of the particles of iron oxide on a surface of the membrane, the layer of particles having a hydraulic conductivity higher than the hydraulic conductivity of the membrane.

14. A method of preparing particles consisting essentially of iron oxide for use in combination with a membrane to remove contaminants from water and reduce fouling of the membrane comprising the steps:

preparing an aqueous solution of ferric ion and hydroxyl ion;

converting the ferric ion to iron oxide particles and producing a suspension of the oxide particles, heating the particles in the suspension at a temperature between about 80° C. and 130° C.; and recovering the heated oxide particles for use as a particulate adsorbent.

15. The method of claim 14, wherein the heating step reduces the water content of the suspension to between about 45 and 55 weight percent.

16. The method of claim 14, wherein the ferric ion is derived from ferric chloride or ferric nitrate.

17. The method of claim 14 wherein the heating step provides particles of iron oxide that are characterized by the substantial absence of a crystalline pattern when x-rayed.

* * * * *

UNITED STATES PATENT AND TRADEMARK OFFICE
CERTIFICATE OF CORRECTION

PATENT NO. : 6,113,792
DATED : September 5, 2000
INVENTOR(S) : M.M. Benjamin et al.

It is certified that error appears in the above-identified patent and that said Letters Patent is hereby corrected as shown below:

Column 14,
Line 5, "and 55 weight" should read -- and about 55 weight --

Signed and Sealed this

Thirty-first Day of July, 2001

*Attest:*

NICHOLAS P. GODICI
*Attesting Officer*     *Acting Director of the United States Patent and Trademark Office*